(12) United States Patent
Fuhrman

(10) Patent No.: US 9,869,274 B2
(45) Date of Patent: Jan. 16, 2018

(54) TWO-STAGE THERMAL HYDRAULIC ENGINE FOR SMOOTH ENERGY CONVERSION

(71) Applicant: Michael L. Fuhrman, Tucson, AZ (US)

(72) Inventor: Michael L. Fuhrman, Tucson, AZ (US)

( * ) Notice: Subject to any disclaimer, the term of this patent is extended or adjusted under 35 U.S.C. 154(b) by 442 days.

(21) Appl. No.: 14/348,544

(22) PCT Filed: Sep. 28, 2012

(86) PCT No.: PCT/US2012/058044
§ 371 (c)(1),
(2) Date: Mar. 28, 2014

(87) PCT Pub. No.: WO2013/049661
PCT Pub. Date: Apr. 4, 2013

(65) Prior Publication Data
US 2014/0238011 A1    Aug. 28, 2014

Related U.S. Application Data

(60) Provisional application No. 61/541,905, filed on Sep. 30, 2011.

(51) Int. Cl.
*F02G 3/02*    (2006.01)
*F04B 9/00*    (2006.01)
(Continued)

(52) U.S. Cl.
CPC .................. *F02G 3/02* (2013.01); *C02F 1/04* (2013.01); *F01K 27/005* (2013.01); *F04B 9/109* (2013.01); *F04B 9/00* (2013.01); *F28F 1/40* (2013.01)

(58) Field of Classification Search
CPC .......... F01K 25/00; F01K 25/02; F01K 25/08; F01K 25/10; F01K 25/103;
(Continued)

(56) References Cited

U.S. PATENT DOCUMENTS 2,986,898 A * 6/1961 Wood, Jr. ................ F25B 41/00
                                                         62/174
3,165,172 A * 1/1965 Baker ....................... F02G 1/04
                                                       123/196 AB
(Continued)

OTHER PUBLICATIONS

International Search Report issued in corresponding application No. PCT/US2012/058044, dated Dec. 27, 2012 (2 pgs).
(Continued)

*Primary Examiner* — Laert Dounis
(74) *Attorney, Agent, or Firm* — Hayes Soloway P.C.

(57) ABSTRACT

A two-stage thermal hydraulic engine utilizes the expansion and contraction of a working fluid to convert heat energy to mechanical or electrical energy. The transfer of heat to and from the working fluid occurs in at least two process heat exchangers and may be aided by thin twisted strips of a thermally conductive material that are in contact with the working fluid. The engine does not require the working fluid to undergo a phase change to operate. The subsequent expansion of the working fluid is used to drive pistons contained within at least two triplex hydraulic cylinders. The pistons may be alternately and sequentially driven to pump a fluid with a laminar flow and at a constant pressure. The cylinders may include a self-lubrication system.

24 Claims, 3 Drawing Sheets

(51) Int. Cl.
*F04B 9/109* (2006.01)
*C02F 1/04* (2006.01)
*F01K 27/00* (2006.01)
*F28F 1/40* (2006.01)

(58) Field of Classification Search
CPC ... F03C 1/02–1/035; F03C 4/00; F03C 99/00; F03G 7/00; F03G 7/06; F28D 7/1607
USPC ............ 60/508, 509, 512, 515, 650, 682, 60/325–494
See application file for complete search history.

(56) References Cited

U.S. PATENT DOCUMENTS

| | | | | |
|---|---|---|---|---|
| 3,587,227 A | | 6/1971 | Weingarten et al. ............ 60/1 |
| 3,991,574 A | * | 11/1976 | Frazier ................ F01K 27/00 | 417/318 |
| 4,068,476 A | * | 1/1978 | Kelsey ................... F01K 7/00 | 126/636 |
| 4,265,275 A | * | 5/1981 | Heller ..................... F28F 1/40 | 138/38 |
| 4,347,701 A | * | 9/1982 | Eddens ................... B60K 3/00 | 180/305 |
| 4,637,211 A | * | 1/1987 | White .................... F01K 25/02 | 60/650 |
| 4,747,271 A | * | 5/1988 | Fischer ................. F01B 29/12 | 60/650 |
| 4,776,171 A | * | 10/1988 | Perry, Jr. ............... C02F 1/047 | 518/702 |
| 5,899,067 A | * | 5/1999 | Hageman ................ F01B 1/00 | 60/516 |
| 6,804,962 B1 | * | 10/2004 | Prueitt ................. B01D 1/0047 | 60/39.6 |
| 2002/0178724 A1 | * | 12/2002 | Hunt ....................... B60K 3/04 | 60/649 |
| 2005/0155347 A1 | | 7/2005 | Lewellin ...................... 60/508 |
| 2010/0307156 A1 | * | 12/2010 | Bollinger ............... H02J 15/006 | 60/682 |
| 2012/0222424 A1 | * | 9/2012 | Ingersoll ................. F02G 1/02 | 60/650 |
| 2013/0031900 A1 | * | 2/2013 | Nelson ................. F28D 7/1607 | 60/530 |

OTHER PUBLICATIONS

International Preliminary Report on Patentability issued in corresponding application No. PCT/US2012/058044, dated Apr. 10, 2014 (6 pgs).

\* cited by examiner

TWO-STAGE THERMAL HYDRAULIC ENGINE FOR SMOOTH ENERGY CONVERSION

The present disclosure relates to a system for capturing heat energy, particularly from low-grade heat sources, and converting it into usable mechanical or electrical energy through the expansion and contraction of a working fluid.

Conversion of energy from one form to another often is required in order to harness energy in a form that is useable in a practical application, including, for example, mechanical energy or electrical energy. Devices well known in the art that are capable of such energy conversion include various types of engines and motors, such as combustion engines, electric motors, and pneumatic motors.

Thermal engines, or heat engines, are devices or systems that convert thermal or heat energy into mechanical work. Commonly known types of heat engines include internal and external combustion engines. Combustion engines operate via the combustion of a fuel, which thereby creates a high level of heat. Typically these engines require fossil fuels, such as gasoline, natural gas, or coal, for operation. The large amount of created heat energy can then be converted into another form of energy, including mechanical energy. However, combustion engines suffer from several disadvantages, including high costs, low efficiency, high levels of environmental and noise pollution, and scarcity and cost of available fuels. The problems of traditional fuels have created a need for devices and systems that can create useful forms of energy from alternate energy sources.

Another type of engine known in the prior art is the hydraulic engine, which utilizes pressurized fluids to produce mechanical energy. These devices convert energy from a heat source into mechanical energy using a working fluid, which expands or contracts with increasing or decreasing temperature. However, current prior art hydraulic engines suffer from several disadvantages. First, current prior art hydraulic engines typically produce pulsated flows, with significant and undesirable peaks in pressure and flow. Also, current prior art hydraulic engines primarily utilize mechanical linkage to convert linear motion to rotation action with coupling to conventional electrical power generation systems. Furthermore, the pistons that are typically utilized to pressurize the fluid require lubrication; however, because of the tendency of working fluids to dissolve, oxidize, or otherwise degrade the lubricant, current prior art engines require frequent changing of the lubricant and frequent cleaning. Thus, current prior art devices suffer from many disadvantages in terms of performance, efficiency, and maintenance.

Additionally, many alternative energy sources provide low-grade energy, which is more difficult to convert to other more useful forms of energy than high-grade energy. To generate power from these sources, prior art devices that are capable of converting low-grade energy, typically must use phase conversion, such as converting water to steam, in order to power a turbine and drive a generator. This reliance on phase conversion reduces the amount of the energy recovered and the overall efficiency of the energy conversion process.

One application of hydraulic pumping known in the prior art is in reverse osmosis (RO) pumping systems. RO systems typically utilize higher pressures to purify a solution by forcing a pressurized solvent through a selective membrane through which certain unwanted molecules and ions cannot pass. RO systems commonly are used in water purification processes, such as producing potable water from seawater. However, typical water pumping systems for RO utilize electricity to operate the pumps. This results in a very inefficient process, in which the cost of the power may account for two thirds of the cost of producing potable water.

The present disclosure addresses the deficiencies of the prior art by providing a system that is capable of converting heat energy, including low-grade heat energy, into mechanical or electrical energy through the expansion and contraction of a working fluid. One advantage of the present disclosure is that, by incorporating at least two process heat exchangers in addition to at least two triplex hydraulic cylinders, it is able to produce smooth, laminar flows, rather than the pulsated flows of the prior art. This allows for much more efficient and predictable performance.

One aspect of the disclosure provides a hydraulic engine that includes a working fluid, at least two process heat exchangers, and at least two triplex hydraulic cylinders. The system captures heat from a heat source, which may be a low-grade heat source such as solar, solar pond, geothermal, biogas, or waste heat. This heat may, for example, be captured through the use of a closed-loop water system. The water is pumped from a tank to a heat exchanger, where it absorbs heat from the heat source. The water is then directed to a process heat exchanger that contains a working fluid. The flow of water into and out of the process heat exchanger may be controlled by control valves and resistive thermal devices (RTD).

The working fluid may be any fluid that expands and contracts in response to changes in temperature, and preferably is a liquefied gas. Inside the process heat exchanger, the heat is transferred to the working fluid, thereby causing it to expand. The working fluid may be contained within tubes within the process heat exchanger. These tubes may include twisted strips of thermally conductive material running through them that provide more efficient transfer of heat between the water and the working fluid.

Once the working fluid has sufficiently expanded, it may be directed to multiple triplex hydraulic cylinders to drive pistons contained therein. Control valves may be used to direct the flow of the working fluid between the process heat exchanger and the triplex hydraulic cylinders. An advantage of the present disclosure is that it does not require the working fluid to undergo a phase change to drive the pistons. It may, depending on the working fluid used, put that working fluid into a super critical state, which is advantageous when working with fluids which are being expanded and contracted to drive pistons which produce laminar flow of water or hydraulic fluids.

Another advantage of the present disclosure is that the working fluid may be directed to the cylinders in a controlled manner such that the pistons are driven in an alternating and sequential manner. This allows the pistons to pump a fluid with a smooth, laminar flow and at a constant pressure. Each cylinder may contain two power pistons and a hydraulic piston, and these pistons may exhibit varying size ratios, depending on the amount of pressure that needs to be generated. Yet another advantage of the present disclosure is that the cylinders may contain a self-lubrication system to protect the pistons and the cylinders and to reduce the frequency of changing the lubricant and cleaning. The lubrication preferably is one that is not soluble in the working fluid.

At the same time that working fluid in at least one process heat exchanger is heated and expanded; working fluid in at least one other heat exchanger is cooled and contracted. This may be done, for example, by using a second closed-loop water system that transfers heat to a cooling source and then directs cooled water to a process heat exchanger. Each process heat exchanger may be used for both heating and cooling of the working fluid. Moreover, another advantage of the present disclosure is that each process heat exchanger may alternate between heating and cooling the working fluid, and the overall sequence by which working fluid is heated and cooled among the various process heat exchangers may be timed and controlled to provide greater control over the driving of the pistons and the flow and pressure of the pumped fluid.

Yet another advantage of the present disclosure is that the pumped fluid may be used in the operation of a reverse osmosis system. In those systems, the wasted pressure generated by the reverse osmosis systems, coming from the concentrated brine, may be recycled and used as a pressurized fluid to rotate a hydroelectric generator. A further advantage of the present disclosure is that it provides greater efficiency over the prior art and typically in the range of 37-42%. The amount of electrical energy needed may be reduced by up to 90%.

Further features and advantages of the present disclosure will be seen from the following detailed description, taken in conjunction with the accompanying drawings, wherein.

Figure 1:
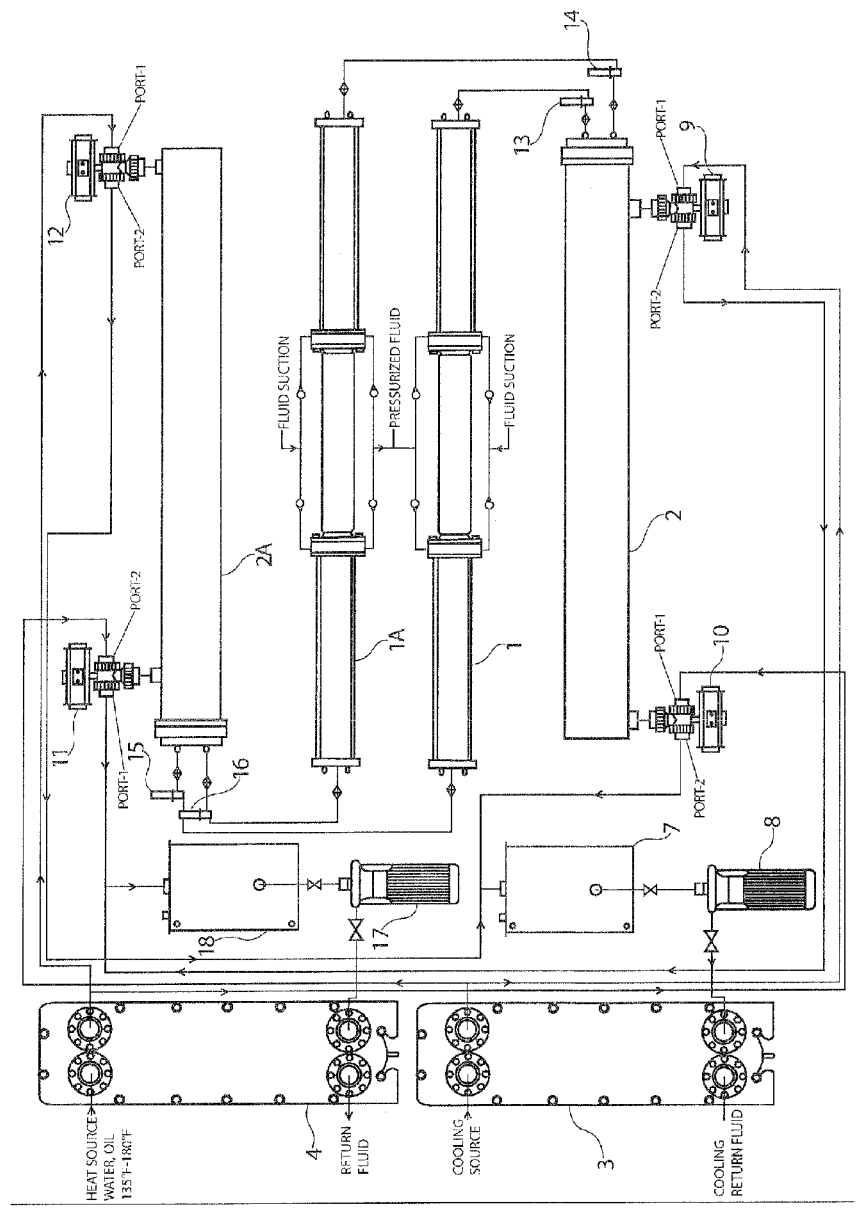
FIG. 1 is a schematic of a preferred embodiment of the present disclosure.

The present disclosure provides an energy conversion system for converting energy, particularly heat energy, into a more usable form through the expansion and contraction of a working fluid. The working fluid may be any fluid that changes volume in response to a temperature change. Liquefied gases, such as liquid $CO_2$, argon and xenon are preferable because of their high rate of expansion and contraction in response to changes in temperature. To facilitate the expansion and contraction of the working fluid, heat may be transferred between the working fluid and a heating and/or cooling source. The expansion and contraction of the working fluid may be used to drive a plurality of pistons, thereby converting the energy from heat into mechanical energy. The generated mechanical energy may further be converted into other forms of energy, such as electrical energy.

The energy source may be any source of heat energy. Though traditional higher energy heat sources may be used, an advantage of this disclosure is that it can utilize low-grade heat sources, such as solar, solar pond, low-grade geothermal, typical geothermal, biogas, waste heat, and others. This feature of the present disclosure is that it may allow as much as a 79-89% reduction in production costs relative to traditional energy supplies.

The energy from the heat source may be captured in one or more closed-loop systems that circulate water or other fluids. In a preferred embodiment, a hot water closed-loop system is utilized to capture heat from a heat source. The closed-loop system may be comprised of a tank, a pump, and a heat exchanger. The pump and heat exchanger may constantly be running or may only circulate the water or other fluid intermittently.

One or more closed-loop systems may also be utilized in conjunction with one or more cooling sources. These systems also may circulate water or other fluid, and each cold water closed-loop system may be comprised of a tank, a pump, and a heat exchanger. The cold water closed-loop system may run continuously or intermittently.

In a preferred embodiment, the energy conversion system includes a plurality of at least two process heat exchangers interconnected to a plurality of at least two cylinders. The plurality of cylinders is preferably comprised of triplex hydraulic cylinders. A working fluid is either heated or cooled in the process heat exchangers and transferred to and from the cylinders. Control valves optionally may be used to direct the flow of the working fluid between the process heat exchangers and the cylinders. Within the interior space of each of the triplex hydraulic cylinders may be two opposing drive pistons that are both connected to a common center piston. The expansion and contraction of the working fluid alternately and sequentially drives the drive pistons in opposing directions, creating a back and forth movement. This movement causes the center piston to pump a fluid to a desired operating pressure. The pumped fluid may be any type of hydraulic fluid, e.g., water or hydraulic oil. Furthermore, the sequential and alternating movement produces a laminar flow and a consistent pressure in the pumped fluid.

Each process heat exchanger may utilize a standard shell and tube design. Within the heat exchanger may be a series of tubes through which the working fluid flows. Heated and/or cooled water, or other fluids, also may be flowed within the process heat exchanger in the interior space between the tubes and the outer shell of the heat exchanger. The design and arrangement of the tubes within the process heat exchanger may be such they result in the flow of the heated and cooled water entering the heat exchanger having higher Reynolds numbers resulting from a serpentine flow through the baffled shell. Furthermore, as heat is conducted between the heated and/or cooled water outside of the tubes and the working fluid within the tubes, the working fluid may expand or contract at a rate proportional to the rate at which the water progresses through the process heat exchanger.

Furthermore, the process heat exchanger and the tubes located therein should be designed such that they can contain the appropriate volume of working fluid necessary to drive all of the required pistons in the plurality of cylinders. There should be sufficient working fluid to move each drive piston an appropriate distance that enables the center piston within the cylinder to pump fluid to a desired pressure. The heated and/or cooled water may flow through the heat exchanger in a serpentine or otherwise nonlinear manner, thereby conducting heat either to or away from the working fluid in the tubes and altering the working fluid's volume at a rate necessary to generate and sustain the pressure necessary for a particular cylinder. Each heat exchanger may further include a single entry point and a single exit point for the heated or cooled water, with the two points optionally located at opposing ends of the heat exchanger. As the heated or cooled water enters and moves through the exchanger, a change in the temperature of the working fluid will be observed as heat is conducted between the water and the working fluid. This in turn will lead to a specific amount of expansion or contraction of the working fluid, along with a correlated increase or decrease in pressure of the working fluid.

In another embodiment, each tube within the process heat exchanger may also contain a thin strip of material. The strip may be twisted several times per foot, preferably at least about four times per foot, and the outer edges of the strip may be in contact with the inner surfaces of the tube. Advantages of including the thin strip include better conduction of heat between the working fluid within the tube and a heating or cooling source outside of the tube. Also, the twists in the strip better enable the working fluid to move from the center of the tube to the inner surfaces of the tube as the working fluid flows within the tube. The strip may be comprised of any thermally conductive metal and in a preferred embodiment is made of aluminum. The strip may also be made of other thermally conductive materials.

Control valves may also be connected to each cylinder. These valves may be high-pressure solenoids and may aid in maintaining the working pressure of the working fluid and maintaining a laminar flow of the working fluid.

In another preferred embodiment, the pistons located within the cylinders may be self-lubricating. An advantage of this embodiment is that it provides a means for lubricating the pistons that maintains minimal contact between the lubricant and the working fluid. This is advantageous because many fluids that can be used as a working fluid dissolve or oxidize many conventional lubricants. Thus, in this embodiment, the power piston contains a small amount of lubricant that is applied to the power cylinder walls as the piston moves back and forth inside of the cylinder. A preferred lubricant used in this embodiment is cottonseed oil, though any typical lubricant known in the art may be used. Two seals located on both sides of the lubricant channel permit only a thin film of lubricant to be placed on the cylinder wall, thereby reducing contact between the lubricant and the working fluid. Each time the piston moves past an area of the cylinder wall, a new layer of lubricant is applied to that portion of the cylinder wall, while the two seals subsequently wipe off much of the lubricant, thereby leaving only a very thin layer on the cylinder wall. This minimizes any long contact with the working fluid, thereby limiting the ability of the working fluid to damage the lubricant, and reducing the frequency of cleaning the cylinder and changing the lubricant. Furthermore, the cylinder wall may have a finish, on the side near the power pistons, of two to three micro-inches. This is in contrast to other hydraulic cylinders, which typically only need a 35 micro-inch finish, and serves, in part, to prevent the working fluid from passing by the seals and neutralizing the piston's movement.

Referring now to FIG. 1, a preferred embodiment of the disclosure including two process heat exchangers (PHE) 2, 2A and two triplex hydraulic cylinders 1, 1A is illustrated. A hot water closed loop system includes hot water pump 17 and tank 18 and heat exchanger 4, which may constantly be running or may run intermittently. A flow of water from the pump proceeds from the tank 18 through pump 17 into heat exchanger 4, where it absorbs the desired heat from the particular heat source. Heat exchanger 4 maintains the closed loop water at the desired temperature setting. The flow then moves to the respective PHE 2 or 2A where it is used to elevate the temperature of the working fluid to produce the increased pressure needed to drive the power piston. The power piston drives the center piston to pressurize the fluids which are used to drive hydraulic motors to generate power or operate equipment, if using hydraulic oil. In an alternate embodiment, the system may pressurize seawater, brackish water or municipal wastewater to push through a reverse osmosis system to produce potable, agricultural, or reuse waters.

A cold water closed loop cooling system includes cooling water pump 8, tank 7 and heat exchanger 3, which may be constantly run. The flow proceeds from tank 7, through pump 8, and into heat exchanger 3, where it is cooled by the cold water system.

Heat is recovered from a heat source and put through a heat exchanger 4, where a closed-loop water system captures that heat and transfers it to PHE 2A through 3-way control valve 12 and enter in Port-1. At the same time, a closed-loop water system in a second heat exchanger 3 loses heat to a cooling source. The cooled water is transferred from heat exchanger 3 to PHE 2 through 3-way control valve 9 Port-1. As the heated water is transferred to PHE 2A and cooling water is transferred to PHE 2, the working fluid, contained within a series of tubes inside the heat exchanger shells of PHEs 2A and 2, are heated and cooled respectively. The heated working fluid in PHE 2A expands, thereby increasing the pressure. The working fluid in PHE 2 is cooled, which causes the working fluid in PHE 2 to contract, thereby reducing its pressure.

As the working fluid in PHE 2A expands, the pressures builds, and at a prescribed time that may depend on the pressure of the working fluid, control valve 15 on cylinder 1 may be opened and the working fluid is allowed to move to the power piston on one side of cylinder 1. Also at a prescribed time that may depend on the pressure of the working fluid, control valve 16 may be opened and the working fluid will flow to the power piston on one side of cylinder 1A. Simultaneously with the heating of PHE 2A, cooling water from a closed loop cooling system will begin to cool the working fluid in PHE 2, which will cause the working fluid contained within the tubes of PHE 2 to contract and reduce pressure. At the conclusion of this cooling process control valves 15 and 16 will close.

Discharge water from PHEs 2 and 2A exits through respective outlets in the PHEs. Valves 10 Port-2 and 11 Port-1, direct the discharge water from PHE 2 and 2A back to the either tank 7 or tank 18. Water that has been used to heat the working fluid in either PHE 2 or 2A, and is therefore cooled when discharged, will be directed to tank 18. Water that has been used to cool the working fluid in either PHE 2 or 2A, and is therefore heated when discharged, will be directed to tank 7. The transfer of water from the PHEs to tanks 7 and 18 will be accomplished by operation of control valves 9, 10, 11 and 12 based on the cycle of operation.

To move the piston in the opposite direction, control valves 9, 10, 11, and 12 will be reversed. Hot water will now enter PHE 2 through valve 10 by Port-1. The cooling water that is contained within PHE 2 will be returned to tank 7 by control valve 9 through Port-2. Simultaneously, in PHE 2A cooling water will be applied through control valve 11 at Port-2 which will force the, previously applied hot water back to Tank 18 through control valve 12 and out of Port-2. The piston will then move in the opposite direction as the pressure increases in PHE 2 as a result of the heated water within the interior of PHE 2 heating the working fluid and causing it to expand. At a prescribed time that may depend on the pressure of the working fluid in PHE 2, control valve 13 may be opened to allow the flow of working fluid from PHE 2 to move to cylinder 1. Also, at a prescribed time that may depend on the pressure of the working fluid in PHE 2, control valve 14 will be opened to allow the working fluid to move to cylinder 1A.

This process then continues, with the heated and cooled water alternating between PHEs 2 and 2A. Furthermore, this process alternatively could be carried out with more than two process heat exchangers, such that the heating and cooling of the working fluids within the process heat exchangers successively alternates among all available process heat exchangers or groups of process heat exchangers. Similarly, this process also could be carried out with more than two hydraulic cylinders in a manner similar to that described above, but with the working fluid being transferred from the process heat exchangers to more than two cylinders after it has expanded.

Figure 2:
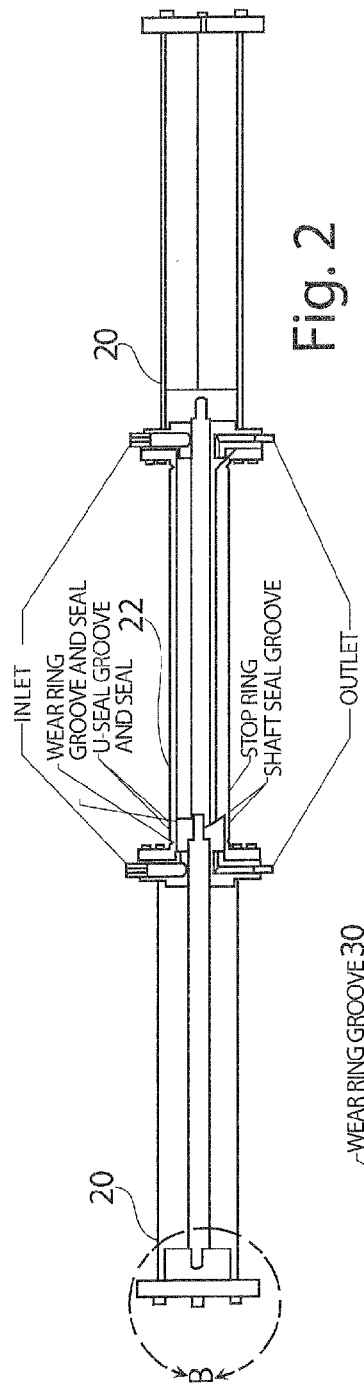
FIG. 2 is a side view and cross-section view of hydraulic cylinder.

Referring now to FIG. 2, a typical triplex hydraulic cylinder is depicted in both side view and cross-sectional view. Power pistons 20 are located at opposing ends of the cylinder. A hydraulic piston 22 is located at the center of the cylinder. A self-lubrication containment groove 24 is located between the two U-Seals on each power piston as will be described below.

Figure 3:
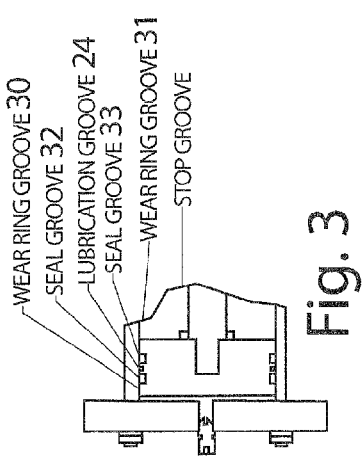
FIG. 3 is a cross-section view of a self-contained lubricating design of the power piston.

FIG. 3 depicts a close-up cross-sectional view of a self-lubricating piston. The self-lubrication mechanism includes an outer wear ring groove 30 and an inner wear ring groove 31. The wear ring grooves each hold a wear ring, which function to minimize contact between the piston and the inner wall of the cylinder wall, thereby reducing wear and damage to the surfaces of the piston and cylinder. An outer seal groove 32 and an inner seal groove 33 are located adjacent to the wear ring grooves 30 and 31 and each function to hold a seal ring that minimizes fluid and lubricant leakage. A lubricant groove 24 is located in between seal grooves 32 and 33 and provides a means through which lubrication is applied to the piston.

Figure 4:
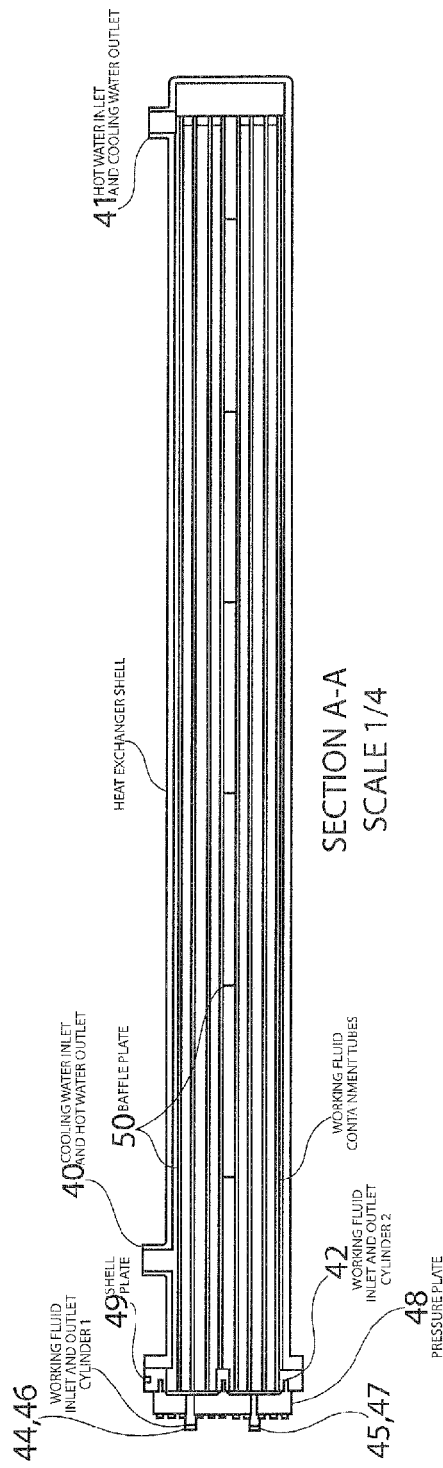
FIG. 4 is a cross-section view of a process heat exchanger.

FIG. 4 depicts a cross-sectional view of the process heat exchanger. Cooling water will enter through process heat exchanger through inlet 40 and hot water will exit. The water then flows through the interior of the process heat exchanger in a serpentine manor, due to the internal baffles 50 where it contacts tubes 42, which contain the working fluid. This allows a cooling effect to be transferred between the water and the working fluid. After flowing through the process heat exchanger, the cooling water is discharged through outlet 41. Additionally, the process heat exchanger includes working fluid inlet/outlet 44 and 46 for each cylinder 1 and 2, respectively, which permits the entry into and discharge from the tubes 42 of the working fluid. A separate inlet and outlet also may be provided for each triplex hydraulic cylinder. A pressure plate 48 and shell plate 49 may also be included near the working fluid inlet and outlet.

In another preferred embodiment, the disclosure may be used to rotate a generator for producing electric power. In this embodiment, the engine will typically pump fluids at pressures in the range of about 5000 to over 32,000 psi, resulting in the high torque levels required to power a generator.

An advantage of the present disclosure is that it converts energy directly to usable power without a phase change and transfers that power directly to, for example, a mechanical motor to drive a generator. In terms of energy conversion, this approach may reach efficiency levels of 37-42%, whereas prior art methods that utilize a phase change process typically only reach efficiency levels of 12-17%.

In another preferred embodiment, the present disclosure may be used as part of a reverse osmosis (RO) desalination system for the production of potable water. In this embodiment, the engine will typically pump fluids at pressures in the range of 1000-1400 psi.

Yet another advantage is that, when used with a reverse osmosis system, the waste energy from the RO system, which generally is recovered and entirely transferred back to the water flowing into the RO system, can instead be converted to electrical power. For example, in a typical seawater RO system, the flow of the concentrated brine from the RO, during seawater RO desalination practices, is generally 55% of the total flow going to the RO. Thus, for a one million gallon per day (MGD) RO, a total flow of 2.22 million gallons is required, which corresponds to a concentrate flow of 850 gallons per minute. The discharge pressure is 850 psi at this flow rate, which, from a hydraulic perspective, equates to a horsepower of 421.5 or 300 kW of power production. Because an RO system incorporating the present disclosure requires only 50 kW to operate, a net 250 kW of excess power is produced. In contrast, a typical 1 MGD RO system requires 705 kW of power to operate the pumping system alone, plus additional power for the controls. Thus, the present disclosure provides the advantage over the prior art of enabling users of RO systems to produce power, rather than only consume power.

In yet another embodiment, the disclosure may be used as a part of a centralized hydraulic power source for producing power and distributing it throughout a manufacturing or other large facility. Recovered energy that has been converted to power in a central location can be distributed like any other source of power throughout a facility and directed to specific hydraulic motors where normally an electric motor would be used. The efficiency of this type of power distribution is better than most electrical operations because of efficiency ratings of hydraulic motors are better. The main advantage, however, is the ability to control motor speed when variable speed control is needed.

Another advantage of the present disclosure is that is takes advantage of low-grade heat, which is easily obtained in contrast to the higher levels of heat required by prior art devices. Hot water at about 135° F. to about 190° F., typically about 180° F. is desired to operate this system. However, warm water at a temperature as low as about 80° F. with a cold water source of about 40° F. may be sufficient for this system to operate and produce power efficiently. Also, the disclosure advantageously may be used with high temperature heat sources such as geothermal which may be about 570° F., or waste heat from power plant turbine discharges which may be from about 700° F. to about 800° F.

When designing the cylinders, standard hydraulic engineering designs may be used to gain certain mechanical advantages. In power production systems, the power pistons on each end are larger than the hydraulic center piston, with a size ratio of 2.1:1 power to hydraulic. This increases the pressure from about 45 psi to about 5000 psi. In water pumping systems, the center piston is larger than the power pistons, with a size ratio of 1:2 power to water, because the pressure only needs to reach about 1100 psi for standard SWRO's and 1400 psi for 3 affect SWRO's.

It should be emphasized that the above-described embodiments of the present apparatus, and "preferred" embodiments, are merely possible examples of implementations and merely set forth for a clear understanding of the principles of the disclosure. Many different embodiments of the disclosure described herein may be designed and/or fabricated without departing from the spirit and scope of the disclosure. All these and other such modifications and variations are intended to be included herein within the scope of this disclosure and protected by the following claims. Therefore the scope of the disclosure is not intended to be limited except as indicated in the appended claims.

The invention claimed is:
1. A two-stage thermal hydraulic engine comprising:
a working fluid that expands and contracts in response to changes in temperature;
at least two process heat exchangers;
at least two triplex hydraulic cylinders;
a plurality of working fluid lines interconnecting each of the at least two process heat exchangers, which con- tains the volume of working fluid with all of the at least two triplex hydraulic cylinders;

a first heat exchanger for capturing heat from at least one external heat source;

a first fluid circuit comprising the first heat exchanger, all of the at least two process heat exchangers, and valves for successively alternating among the at least two process heat exchangers in a predetermined order the transfer of heat between the first heat exchanger and the at least two process heat exchangers;

the first heat exchanger configured for transferring the captured heat to a first portion of the working fluid contained within at least one of the process heat exchangers, whereby the working fluid expands without undergoing a phase change, and directing a sufficient quantity of the first portion of the working fluid from the at least one of the process heat exchangers to the cylinders to drive pistons within the cylinders in a sequential, alternating manner, thereby pumping a second fluid with a laminar flow and desired pressure;

a second heat exchanger;

a second fluid circuit comprising the second heat exchanger, all of the at least two process heat exchangers, and the valves for successively alternating among the at least two process heat exchangers in a predetermined order the transfer of heat between the second heat exchanger and the at least two process heat exchangers;

the second heat exchanger configured for concurrently transferring heat away from a second portion of the working fluid contained within at least one of the process heat exchangers that is not concurrently being used to heat the first portion of the working fluid, whereby the second portion of the working fluid contracts without undergoing a phase change.

2. The two-stage thermal hydraulic engine according to claim 1, whereby the second fluid is pumped at a constant pressure.

3. The two-stage thermal hydraulic engine according to claim 1, wherein the working fluid is selected from the group consisting of liquid CO2, xenon, and argon.

4. The two-stage thermal hydraulic engine according to claim 1, wherein each process heat exchanger comprises an interior space and wherein a series of tubes are located within the interior space, said tubes containing working fluid.

5. The two-stage thermal hydraulic engine according to claim 1, further comprising a resistive temperature detector to control operation of the valve.

6. The two-stage thermal hydraulic engine according to claim 1, wherein the first fluid circuit or the second fluid circuit further comprises a tank and a pump.

7. The two-stage thermal hydraulic engine according to claim 6, wherein the at least one closed-loop fluid system comprises water at about 700° F. to about 800° F., or at about 570° F., or at about 135° F. to about 190° F.

8. The two-stage hydraulic engine according to claim 7, wherein the water is at a temperature of about 180° F.

9. The two-stage thermal hydraulic engine according to claim 6, wherein one closed-loop fluid system comprises water at about 80° F. and a second closed-loop fluid system comprises water at 40° F.

10. The two-stage thermal hydraulic engine according to claim 1, wherein said cylinders comprise a self-lubricating piston.

11. The two-stage thermal hydraulic engine according to claim 1, wherein the heat source is a low-grade heat source selected from the group consisting of solar, solar pond, low-grade geothermal, geothermal, biogas, and waste heat.

12. The two-stage thermal hydraulic engine according to claim 1, wherein the engine operates as a reverse osmosis desalination pump, wherein the reverse osmosis desalination pump optionally generates waste pressure that is recycled and used as a power source.

13. The two-stage thermal hydraulic engine according to claim 12, wherein reverse osmosis concentrate fluid from the desalination pump is used to power a generator.

14. The two-stage thermal hydraulic engine according to claim 1, wherein the engine has an efficiency of 37-42%.

15. The two-stage thermal hydraulic engine according to claim 1, wherein the triplex hydraulic cylinders comprise a hydraulic center piston and two power pistons, wherein one power piston is located at each end of the center piston.

16. The two-stage thermal hydraulic engine according to claim 15, characterized by one-of the following features:
(a) wherein the power pistons and the center hydraulic piston have a size ratio of 2.1:1, power to hydraulic; or
(b) wherein the power pistons and the center hydraulic piston have a size ratio of 1:2, power to hydraulic.

17. The two-stage thermal hydraulic engine according to claim 1, wherein the second fluid is used as part of a hydraulic power source for producing and distributing power throughout a facility.

18. The two-stage thermal hydraulic engine according to claim 1, comprising four triplex hydraulic cylinders.

19. The two-stage thermal hydraulic engine according to claim 4, further comprising a twisted strip of thermally conductive material within the tubes of the process heat exchanger, wherein the strip is twisted at least four times per foot, and wherein a first edge of the strip and an opposing second edge of the strip are both in contact with an interior surface of each tube.

20. The two-stage thermal hydraulic engine according to claim 19, wherein the strip of material comprises a metal.

21. The two-stage thermal hydraulic engine according to claim 20, wherein the strip of material comprises aluminum.

22. The two-stage thermal hydraulic engine according to claim 16, wherein the pistons have a capacity to pump the second fluid to a pressure of at least 5,000 psi.

23. The two-stage thermal hydraulic engine according to claim 16, wherein the pistons have a capacity to pump the second fluid to a pressure of up to about 1,100 psi.

24. The two-stage thermal hydraulic engine according to claim 1, wherein each of the process heat exchangers contains a volume of working fluid sufficient for up to four power pistons of four triplex hydraulic cylinders.

* * * * *